UNITED STATES PATENT OFFICE 2,029,007

ANTHRAPYRIDONE SULPHONIC ACIDS AND THE PROCESS OF MAKING THEM

Klaus Weinand, Leverkusen-I. G. Werk, Germany, assignor to General Aniline Works, Inc., New York, N. Y., a corporation of Delaware No Drawing. Application November 11, 1932, Serial No. 642,329. In Germany November 14, 1931

8 Claims. (Cl. 260—42)

The present invention relates to a process of preparing condensation products of the anthraquinone series and to the new condensation products obtainable by said process.

In accordance with the present invention new condensation products of the anthraquinone series are obtained by reacting with a compound of the probable formula:—

$$X-CH_2-COOR$$

upon a compound of the probable formula:—

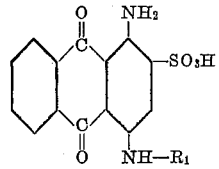

In the above formulæ R means an alkyl group, such as methyl, ethyl, propyl, isopropyl, butyl etc., X stands for the group —CO—CH$_3$ or —COOR$_2$ (R$_2$=alkyl as disclosed above), and R$_1$ means an alkyl-, aryl-, aralkyl- or hydroaryl radical. All the nuclei of the compounds in question may be substituted by monovalent substituents. Such, for example, anthraquinone derivatives may be applied as starting materials being substituted in the anthraquinone nucleus by halogen atoms (chlorine or bromine, for example), alkyl groups (CH$_3$, C$_2$H$_5$ etc.), hydroxy groups, alkoxy groups, carboxylic acid groups, sulphonic acid groups etc. Likewise the group R$_1$ may be substituted in the most various manner, for example, by the substituents outlined above or by amino-, acetamino-, carboxylic acid amide- or ester groups, thioether groups etc.

The reaction can be performed by heating the reaction components, advantageously to a temperature of between about 150 and about 200° C. The addition of a solvent is not necessary but may be desirable in many cases. Organic solvents giving especially good results are those being inert to the starting materials but being capable of dissolving both of the same. The best results have been obtained when applying a phenol as the solvent. Furthermore, it is advantageous, but likewise not necessary, to add an alkaline reacting medium to the reaction mixture, such as an alkali metal hydroxide, an earthalkali metal oxide or—hydroxide, a salt of the alkali or earthalkali metals possessing alkaline properties, magnesium oxide etc.

The compounds thus obtainable correspond in their free form to the probable general formula:—

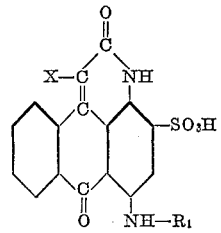

wherein the littera are to be explained as mentioned before, and are formed according to the probable equation:—

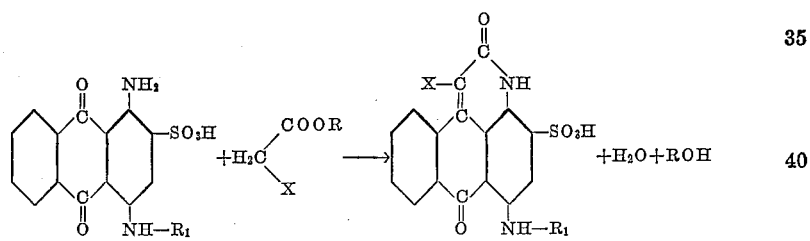

They form red to blue needles or leaflets, dissolving in water with the same coloration, and in concentrated sulphuric acid with a yellow to red coloration. They dye wool from an acid bath clear and even red to violet shades of good fastness properties.

The following examples illustrate the invention without, however, limiting it thereto, the parts being by weight:—

*Example 1*

20 parts of 1-amino-4-methylamino-anthraquinone-2-sulphonic acid and 0.5 part of sodium acetate are boiled in 100 parts by weight of malonic acid dimethylester, until the original blue coloration has changed to red. The excess of malonic acid ester is driven off with steam and the dyestuff is precipitated by means of sodium chloride. It crystallizes in red needles, dyeing wool from an acid bath ruby red shades.

*Example 2*

20 parts of 1-amino-4-anilido-anthraquinone-2-sulphonic acid, 150 parts of phenol and 20 parts of malonic acid diethylester are heated to 180° C., until the blue coloration of the reaction mixture has changed to violet. The melt is then cooled to 100° C. and stirred into 150 parts of 30° Bé. caustic soda solution, whereupon the phenol passes into solution as sodium phenate and the dyestuff separates in blue needles. The dyestuff dyes wool violet from an acid bath.

The condensation can be accelerated by the addition of 0.1 part of sodium hydroxide or potassium hydroxide or of sodium—or potassium carbonate.

Similar dyestuffs are produced by replacing in the above example the 1-amino-4-anilido-anthraquinone-2-sulphonic acid by 1-amino-4-para-toluidoanthraquinone-2-sulphonic acid; 1-amino-4-ortho-, -meta- or -para-ethylanilidoanthraquinone-2-sulphonic acid; 1-amino-4-xylidino-anthraquinone-2-sulphonic acid; 1-amino-4-meta-chloranilidoanthraquinone-2-sulphonic acid; 1-amino-4-para-acetylaminoanilido-anthraquinone-2-sulphonic acid; 1-amino-6-chloro-4-anilidoanthraquinone-2-sulphonic acid (obtainable by reacting upon 1-amino-2,4-dibromo-6-chloranthraquinone with aniline and treating the reaction product obtained with sodium sulphite), 1-amino-4-anilidoanthraquinone-2,6-disulphonic acid (obtainable from 1-aminoanthraquinone-6-sulphonic acid by bromination, condensation of the reaction product with aniline and treatment of the product thus obtained with sodium sulphite); 1-amino-4-anilidoanthraquinone-2,5-disulphonic acid; 1-amino-4-tetrahydronaphthylaminoanthraquinone-2-sulphonic acid; 1-amino-4-benzylaminoanthraquinone-2-sulphonic acid; 1-amino-4-hexahydroanilidoanthraquinone-2-sulphonic acid.

(In the last case it has been found advantageous to employ a temperature of 150° C.-160° C.)

In the above examples the manufacture of the condensation products of the respective anthraquinone derivatives with malonic acid esters is described. When replacing in these examples the malonic acid esters by the same quantities of aceto-acetic acid esters and otherwise working in exactly the same manner, the corresponding dyestuffs being substituted in the pyridone nucleus by the —COCH₃ group, are obtained. These dyestuffs scarcely differ in their properties from the dyestuffs described in the examples. It seems, therefore, unnecessary to give detailed examples for the use of aceto-acetic acid esters as the starting materials, since these examples would only be a duplicate of the foregoing examples, except that the words malonic acid dimethylester (Example 1) or malonic acid diethyl-ester (Example 2) would be replaced by aceto-acetic methyl- or ethyl-ester respectively.

I claim:—

1. The product having in its free form the formula:—

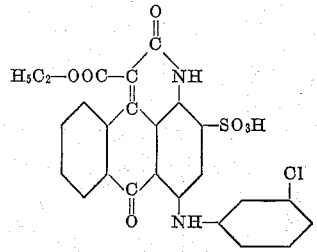

said product dyeing wool red shades of good fastness properties.

2. The process which comprises heating an 1,4-diaminoanthraquinone-2-sulphonic acid, the 4-amino group of which has one hydrogen atom replaced by an alkyl-, phenyl-, chlorophenyl-, acetamino-phenyl-, benzyl-, hydronaphthyl- or hydrophenyl group, with a compound having the configuration —CO—CH₂—CO— selected from the group consisting of malonic acid esters and aceto-acetic acid esters of aliphatic alcohols.

3. The process which comprises heating to a temperature of between about 150° and about 200° C. an 1,4-diaminoanthraquinone-2-sulphonic acid, the 4-amino group of which has one hydrogen atom replaced by an alkyl-, phenyl-, chlorophenyl-, acetamino-phenyl-, benzyl-, hydronaphthyl- or hydrophenyl group, with a compound having the configuration —CO—CH₂—CO— selected from the group consisting of malonic acid esters and aceto-acetic acid esters of aliphatic alcohols.

4. The process which comprises heating an 1,4-diaminoanthraquinone-2-sulphonic acid, the 4-amino group of which has one hydrogen atom replaced by an alkyl-, phenyl-, chlorophenyl-, acetamino-phenyl-, benzyl-, hydronaphthyl- or hydrophenyl group, with a compound having the configuration —CO—CH₂—CO— selected from the group consisting of malonic acid esters and aceto-acetic acid esters of aliphatic alcohols, the reaction being performed in the presence of an alkaline reacting substance and of an organic solvent which is inert to the starting materials and capable of dissolving both the starting materials.

5. The process which comprises heating to a temperature of between about 150° and 200° C. an 1,4-diaminoanthraquinone-2-sulphonic acid, the 4-amino group of which has one hydrogen atom replaced by an alkyl-, phenyl-, chlorophenyl-, acetamino-phenyl-, benzyl-, hydronaphthyl- or hydrophenyl group, with a compound having the configuration —CO—CH₂—CO— selected from the group consisting of malonic acid esters and aceto-acetic acid esters of aliphatic alcohols, the reaction being performed in the presence of an alkaline reacting substance and of an organic solvent which is inert to the starting materials and capable of dissolving both the starting materials.

6. The process which comprises heating to a temperature of between about 150° and about 200° C. an 1,4-diaminoanthraquinone-2-sulphonic acid, the 4-amino group of which has one hydrogen atom replaced by an alkyl-, phenyl-, chlorophenyl-, acetamino-phenyl-, benzyl-, hydronaphthyl- or hydrophenyl group, with a compound having the configuration —CO—CH₂—CO— selected from the group consisting of malonic acid esters and aceto-acetic acid esters of aliphatic alcohols, the reaction being performed in the presence of phenol and of an alkaline reacting medium selected from the group consisting of sodium- and potassium hydroxide, sodium- and potassium carbonate, and sodium- and potassium acetate.

7. The compounds of the type

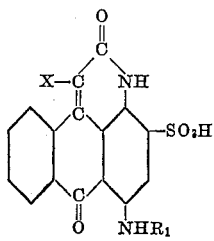

in which X stands for —CO—CH$_3$ or —COO—alkyl, and R$_1$ stands for an alkyl-, phenyl-, chlorophenyl-, acetamino-phenyl-, benzyl-, hydronaphthyl- or hydrophenyl group, said compounds forming red to blue crystals, soluble in water with the same colorations, in strong sulphuric acid with a yellow to red coloration, dyeing wool from an acid bath clear red to violet shades of good fastness properties.

8. The products as claimed in claim 7, in which R$_1$ stands for a chlorobenzene group.

KLAUS WEINAND.